United States Patent
Sprinzl et al.

(10) Patent No.: US 12,358,550 B2
(45) Date of Patent: Jul. 15, 2025

(54) APPARATUS AND METHOD FOR INFLUENCING A VEHICLE BEHAVIOR

(71) Applicant: Robert Bosch GmbH, Stuttgart (DE)

(72) Inventors: Michael Sprinzl, Suessen (DE); Stefan Kanngiesser, Schwaebisch Gmuend (DE); David Antonio Arriola Gutierrez, Leonberg (DE); Tobias Neulen, Baesweiler (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 18/548,199

(22) PCT Filed: Dec. 14, 2021

(86) PCT No.: PCT/EP2021/085584
§ 371 (c)(1),
(2) Date: Aug. 28, 2023

(87) PCT Pub. No.: WO2022/189021
PCT Pub. Date: Sep. 15, 2022

(65) Prior Publication Data
US 2024/0132142 A1    Apr. 25, 2024
US 2024/0227914 A9    Jul. 11, 2024

(30) Foreign Application Priority Data
Mar. 9, 2021   (DE) .................... 10 2021 202 285.5

(51) Int. Cl.
*B62D 5/06*     (2006.01)
*B60W 40/09*    (2012.01)
(Continued)

(52) U.S. Cl.
CPC ............. *B62D 5/006* (2013.01); *B60W 40/09* (2013.01); *B60W 2420/408* (2024.01); *B60W 2510/20* (2013.01); *B60W 2554/4046* (2020.02)

(58) Field of Classification Search
CPC ................................ B62D 5/006; B62D 6/003
See application file for complete search history.

(56) References Cited

U.S. PATENT DOCUMENTS

| | | | |
|---|---|---|---|
| 9,399,486 B2 * | 7/2016 | Takeda | B62D 6/008 |
| 2013/0124045 A1 * | 5/2013 | Suzuki | B62D 7/159 701/41 |

(Continued)

FOREIGN PATENT DOCUMENTS

| | | |
|---|---|---|
| DE | 100 52 559 A1 | 4/2002 |
| DE | 10 2018 200 251 A1 | 12/2018 |

(Continued)

OTHER PUBLICATIONS

International Search Report corresponding to PCT Application No. PCT/EP2021/085584, mailed Apr. 13, 2022 (German and English language document) (5 pages).

*Primary Examiner* — Long T Tran
(74) *Attorney, Agent, or Firm* — Maginot, Moore & Beck LLP

(57) ABSTRACT

A method and apparatus is for influencing a vehicle behavior of a vehicle in which a setpoint for a steering wheel actuator of a steering system, in particular of a steer-by-wire steering system, is determined independently of a setpoint for a wheel steering gear actuator, and the steering wheel actuator is actuated depending on the setpoint for the steering wheel actuator. The method further includes determining a setpoint for a wheel steering gear actuator of the steering system independently of the setpoint for the steering wheel actuator, and the wheel steering gear actuator is actuated depending (Continued)

on the setpoint for the wheel steering gear actuator. The setpoint for the steering wheel actuator is determined depending on a target value for influencing the steering wheel actuator.

9 Claims, 3 Drawing Sheets

(51) Int. Cl.
    *B62D 5/00*     (2006.01)
    *B62D 6/00*     (2006.01)

(56) References Cited

U.S. PATENT DOCUMENTS

| | | | | |
|---|---|---|---|---|
| 2017/0210414 | A1* | 7/2017 | Sato | B60W 10/20 |
| 2018/0086341 | A1* | 3/2018 | Taniguchi | B62D 6/008 |
| 2018/0304922 | A1* | 10/2018 | Hirate | B62D 5/008 |
| 2018/0354555 | A1* | 12/2018 | Sheng | B62D 15/0255 |
| 2020/0156639 | A1* | 5/2020 | Liu | B60W 30/182 |
| 2020/0262478 | A1* | 8/2020 | Sato | B62D 15/021 |
| 2021/0139016 | A1* | 5/2021 | Horiguchi | B60W 50/0097 |
| 2021/0221357 | A1* | 7/2021 | Woolliscroft | G06V 20/56 |

FOREIGN PATENT DOCUMENTS

| | | |
|---|---|---|
| DE | 11 2019 000 362 T5 | 10/2020 |
| WO | 2014/115234 A1 | 7/2014 |
| WO | 2016/162902 A1 | 10/2016 |
| WO | 2019/116453 A1 | 6/2019 |

\* cited by examiner

APPARATUS AND METHOD FOR INFLUENCING A VEHICLE BEHAVIOR

This application is a 35 U.S.C. § 371 National Stage Application of PCT/EP2021/085584, filed on Dec. 14, 2021, which claims the benefit of priority to Serial No. DE 10 2021 202 285.5, filed on Mar. 9, 2021 in Germany, the disclosures of which are incorporated herein by reference in their entirety.

BACKGROUND

The disclosure relates to an apparatus and a method for influencing a yaw behavior of a vehicle equipped with the steer-by-wire steering system. The steer-by-wire steering system comprises two separate interfaces: an interface for influencing the steering wheel actuator and an interface for influencing the wheel steering gear actuator.

WO 2014/115234 A1 and WO 2019/116453 A1 disclose aspects of steering systems for vehicles with which it is possible to influence the yaw behavior of such vehicles. WO 2016/162902 discloses aspects of a lane assistance system for vehicles, which influences a yaw behavior with a controller.

SUMMARY

One of the requirements for a lane guidance function that operates at least semi-autonomously, i.e., independently of the driver, is to assist the driver in the lateral guidance of his vehicle. To meet this requirement, the lane guidance function can specify torque recommendations and/or steering wheel movements for the driver that provide the driver with haptic feedback that is suitable for keeping the vehicle at a set position in a lane. Another requirement relates to the reduction of a deviation between the set position and the real position of the vehicle in the lane. The driver's control of the vehicle must be ensured at all times, e.g., when switching from a state of semi-autonomous or autonomous driving into a state in which the driver drives by himself.

Current steering systems cannot meet these first two requirements for a lane guidance function at the same time, because the mechanical coupling between the steering wheel and the steered wheels creates a conflict of goals. The result is, for example, an undesirable behavior of the steering wheel when the focus of the functional application is to reduce the set position deviation. For this reason, the lane guidance function with conventional controls and steering systems cannot exhaust all of its possibilities or meet the requirements placed on it.

With the subject-matter of the independent claims, these conflicts in the actuation of steer-by-wire steering systems are eliminated. On the one hand, this significantly improves the performance of existing lane guidance systems with respect to the aforementioned requirements and, on the other hand, enables completely new possibilities for lane guidance and interaction with the driver.

A method for influencing a vehicle behavior of a vehicle, wherein: a setpoint for a steering wheel actuator of the steering system, in particular of a steer-by-wire steering system, is determined independently of a setpoint for a wheel steering gear actuator, and the steering wheel actuator is actuated depending on the setpoint for the steering wheel actuator; a setpoint for a wheel steering gear actuator of the steering system is determined independently of the setpoint for the steering wheel actuator, and the wheel steering gear actuator is actuated depending on the setpoint for the wheel steering gear actuator; the setpoint for the steering wheel actuator is determined depending on a target value for influencing the steering wheel actuator; the target value for influencing the steering wheel actuator is determined in particular by a first controller depending on a deviation of a current behavior of the vehicle from a setpoint for the behavior of the vehicle; the setpoint for the wheel steering gear actuator is determined depending on a target value for influencing the wheel steering gear actuator; and the target value for influencing the wheel steering gear actuator is determined in particular by a second controller depending on the deviation. The first controller thus determines an influencing of the steering wheel behavior of the vehicle, which is provided by the steering wheel actuator. The second controller thus determines an influencing of wheel steering angles for the vehicle, which is provided by the wheel steering gear actuator. That is to say, the steering wheel actuator and the wheel steering gear actuator can be operated or influenced either independently from one another or dependently on one another.

The advantage of this method is that the vehicle can be laterally guided independently of the driver. The goals of the vehicle lateral guidance and the goals of the steering wheel behavior can be of any nature, i.e., they can be dependent on as well as independent of one another. Thus, in the case of a driver assistance function with a steer-by-wire steering system, a comfortable steering wheel behavior is enabled, for example without impairing the position control of the vehicle within the lane.

Preferably, the target value for influencing the steering wheel actuator is determined depending on an in particular applicable first controller parameter, wherein the target value for influencing the wheel steering gear actuator is determined depending on an in particular applicable second controller parameter, wherein the first controller parameter specifies different dynamics compared to the second controller parameter. This allows different controller dynamics to be used.

Preferably, the first controller parameter is determined depending on a selected driving profile or detected driver profile and a driver assistance function activated in the vehicle for influencing the vehicle behavior. This allows the controller dynamics to be determined depending on the driver assistance function.

Preferably, the target value for influencing the wheel steering gear actuator is used exclusively for influencing the vehicle behavior. As a result, the steering wheel actuator is influenced independently of the target value for influencing the wheel steering gear actuator. This allows for an independent feedback to the driver via the steering wheel.

It can be provided that information about an environment of the vehicle is captured, in particular with a camera, a radar system, or a LiDAR system, wherein a set trajectory for the vehicle is determined depending on the information, wherein the setpoint for the vehicle behavior is determined depending on the set trajectory. These sensors are particularly well-suited for determining the set trajectory.

Vehicle behavior in this context means the vehicle's lateral guidance behavior. In one aspect, the setpoint for the vehicle behavior specifies a set yaw rate, or a target curvature, or a target lateral speed, or a target lateral acceleration.

An apparatus for influencing a vehicle behavior of a vehicle by way of a steering system, in particular a steer-by-wire steering system, comprises an interface for a target value for influencing the steering wheel actuator, an interface for a target value for influencing the steering wheel actuator, a first controller, and a second controller, which are configured so as to carry out steps in the method according to any one of the preceding claims.

A steering system, in particular for a vehicle, can comprise the apparatus.

BRIEF DESCRIPTION OF THE DRAWINGS

Further advantageous embodiments arise from the following description and the drawing. The drawings show.

DETAILED DESCRIPTION

Figure 1:
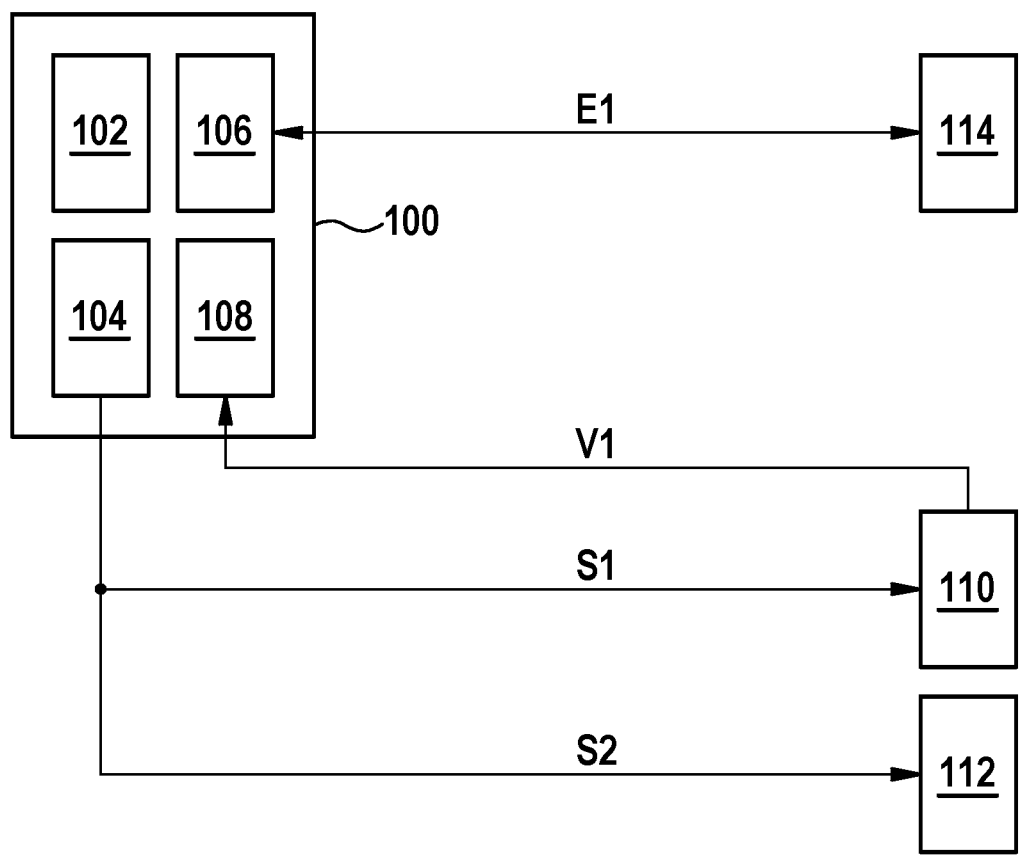
FIG. 1 a schematic illustration of an apparatus for operating a steering system, FIG. 2 aspects of a method for influencing a yaw behavior of a vehicle by way of a steering system.

In FIG. 1, an apparatus 100 for operating a steering system, in particular for a vehicle, is shown schematically.

The apparatus 100 comprises a computing device 102 and an actuating device 104.

The apparatus 100 also comprises an input device 106 and an interface 108.

The apparatus 100 can be a control unit, with which the steering system of the vehicle can be actuated.

The computing device 102 is configured so as to determine a setpoint S1 for a steering wheel actuator 110 of the steering system. The computing device 102 is configured so as to determine a setpoint S2 for a wheel steering gear actuator 112 of the steering system.

The apparatus 100 further comprises an interface (not shown in FIG. 1) for a target value T3 for influencing the steering wheel actuator 110 and an interface (not shown in FIG. 1) for a target value T4 for influencing the wheel steering gear actuator 112. These are described below.

In the example, the input device 106 can be operated via a graphical user interface 114, for example, a menu of a driver assistance system.

The computing device 102 is configured so as to determine the setpoint S1 for the steering wheel actuator 110, among other things depending on a specification V1 of a driver.

The computing device 102 is configured so as to determine the setpoint S2 for the wheel steering gear actuator 112, among other things depending on the specification V1 of a driver.

The computing device 102 is configured so as to capture an input E1, in particular of a user, in particular via the user interface 114.

The computing device 102 is configured so as to operate the steering system depending on the input E1 in any of the operating modes described below.

The actuating device 104 is configured so as to actuate the steering wheel actuator 110 depending on the setpoint S1 for the steering wheel actuator 110. The actuating device 104 is configured so as to actuate the wheel steering gear actuator 112 depending on the setpoint S2 for the wheel steering gear actuator 112.

A method for influencing a vehicle behavior of a vehicle by way of a steering system, in particular a steer-by-wire system, will be described below with reference to FIG. 2, using the example of a yaw behavior using a set yaw rate and an actual yaw rate. A setpoint for the vehicle behavior can be any other setpoint that specifies a desired lateral guidance of the vehicle. Instead of the set yaw rate, a set curvature or a set lateral speed or a set lateral acceleration can be used.

The vehicle behavior can be characterized by any other actual value describing a current lateral guidance of the vehicle. For example, rather than the actual yaw rate, an actual curvature or an actual lateral speed or an actual lateral acceleration can be used. The aforementioned functionalities can be achieved with these, for example.

Figure 2:
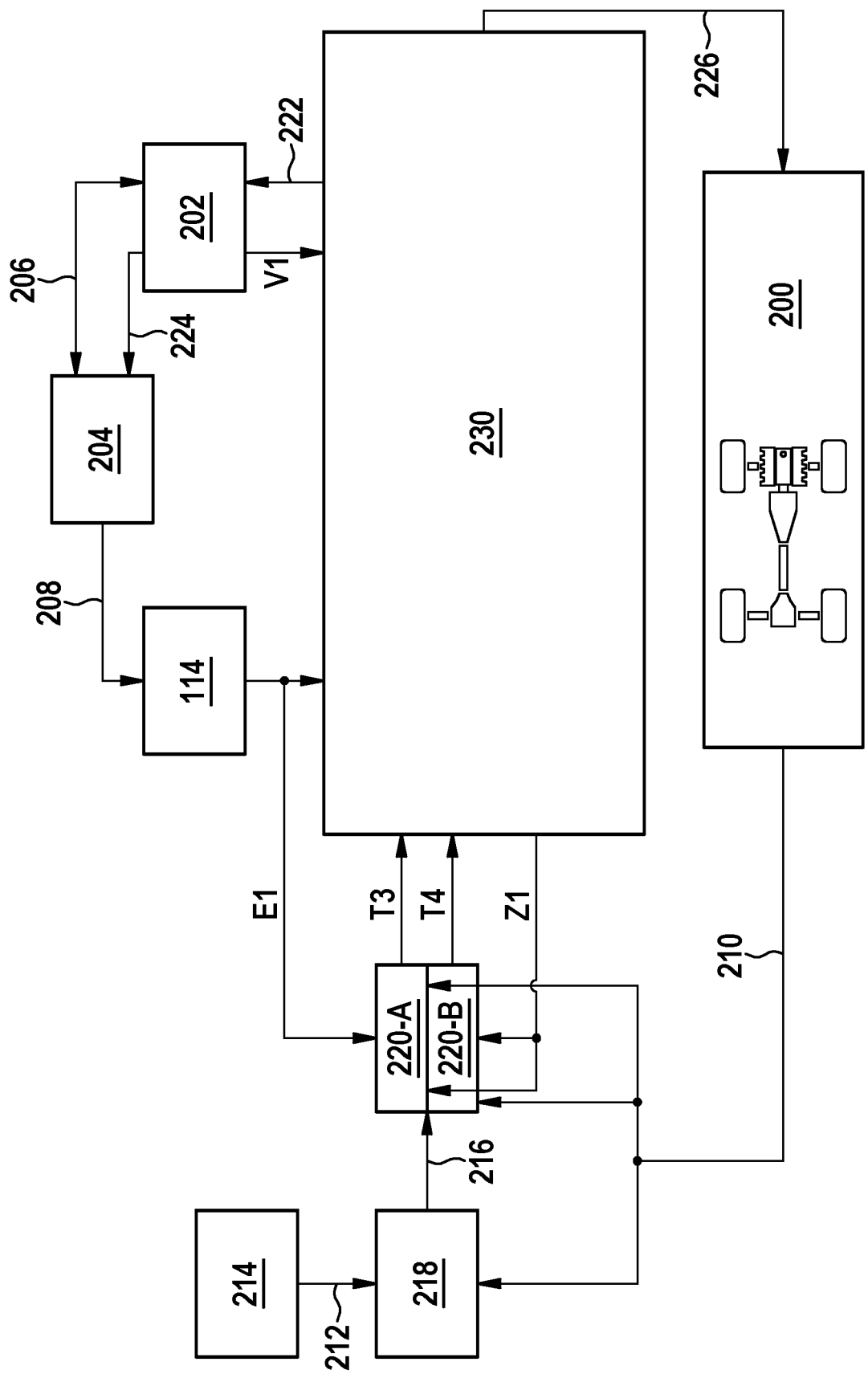

In FIG. 2, the vehicle is shown schematically and bears the reference numeral 200. The vehicle 200 can be actuated via an operating element, in the example a steering wheel 202, by a driver 204. In the example, the steering system comprises the steering wheel actuator 110 and the wheel steering gear actuator 112. The steering system is shown schematically in FIG. 2 and bears the reference numeral 230. The steering system 230 further provides a driver-vehicle interaction strategy, in particular for a driver assistance function, for influencing the steer-by-wire steering system. In the example, the driver 204 can specify a steering wheel angle 206 for the steering wheel actuator 110 via the steering wheel 202 as a specification V1. In the example, the driver 204 can specify an operating state 208 for the nature of the driver assistance function via the user interface 114. The user interface 114 provides the input E1.

Various natures of the driver assistance function are possible with this method. By way of example, one possibility for a nature is described in further detail below and is referred to as the "comfort mode."

"Comfort Mode":

The driver has no influence on a wheel steering angle on the road within an adjustable independent range of a lane guidance function. In this range, a change in the steering wheel angle 206, in particular by the driver 204, thus has no influence on the wheel steering angle on the road. In this range, the wheel steering angle on the road is determined exclusively by the lane guidance function via the target value T4 for influencing the wheel steering gear actuator. As a result, a lane control, as well as small changes caused by, for example, lateral wind or road conditions, can be implemented by the lane guidance function without a disruptive haptic feedback to the driver 204. To this end, the target value T3 for influencing the steering wheel actuator 110 is not additionally used or applied by the lane guidance function, e.g., by being constantly 0. This results in a smoother steering wheel behavior and thus increases the driving comfort.

In a further nature, it is provided that in this "comfort mode" by means of the target value T3 for influencing the steering wheel actuator 110, a haptic feedback is formed due to a vehicle environment and/or the lane control or other influences arbitrarily and independently of the wheel steering angle control.

In this mode, when criteria for operation in this independent range are no longer given, the driver 204 gradually regains control of the wheel steering angle on the road. For example, with increasing deviation between a set wheel steering angle, requested by the driver 204 virtually via the steering wheel angle 206 on the steering wheel, and the wheel steering angle set by the lane guidance function on the road, the driver 204 gradually regains control, i.e., the range of independence will be gradually exited, because the driver 204 is to be responsible for lateral guidance of the vehicle.

For functions other than the lane guidance function, a similar procedure can be provided. For operating elements other than the steering wheel 202, a similar procedure can be provided.

In the example, a vehicle state 210 is provided. In the example, the vehicle state 210 comprises a current yaw rate and a current speed of the vehicle 200. These can be captured by sensors or calculated using models.

In the example, information about an environment of the vehicle 212 is provided. For example, the information about the environment of the vehicle 212 is captured by a sensory system 214. In the example, a setpoint for the yaw behavior of the vehicle 216 is determined depending on the vehicle state 210 and the information about the environment of the vehicle 212. In the example, the setpoint for the yaw behavior of the vehicle 216 is provided by a trajectory planning and control device 218.

In the example, the sensory system 214 comprises at least one camera, at least one LiDAR, or at least one radar sensor. In the example, the sensory system 214 comprises detection logic configured so as to detect a lane on a road. In the example, the information about the environment of the vehicle 212 represents the lane.

For example, trajectory planning and control device 218 is configured so as to determine a trajectory that follows the lane and, depending on a current vehicle behavior, specify a setpoint for the yaw behavior of vehicle 216 that is necessary for following the trajectory.

In the example shown in FIG. 2, a first controller 220-A and a second controller 220-B are provided, which operate, among other things, on the basis of the input E1 and thus the desired nature of the driver assistance function.

The first controller 220-A is configured so as to calculate the target value T3 for influencing the steering wheel actuator 110. For example, based on the input E1, among other things, the target value T3 can be determined depending on the setpoint for the yaw behavior of the vehicle 216.

It is also possible to influence the vehicle's yaw behavior only via the target value T3, i.e., via the steering wheel actuator 110. The first controller 220-A can thus be configured so as to regulate the setpoint for the yaw behavior of the vehicle 216 depending on the current yaw behavior of the vehicle such that the vehicle carries out a corresponding movement that follows the setpoint for the yaw behavior of the vehicle 216 to the extent possible.

The second controller 220-B is configured so as to calculate the target value T4 for influencing the wheel steering gear actuator for the vehicle. For example, based on the input E1, among other things, the target value T4 can be determined depending on the setpoint for the yaw behavior of the vehicle 216. The second controller 220-B is configured so as to regulate the setpoint for the yaw behavior of the vehicle 216 depending on the current yaw behavior of the vehicle such that the vehicle carries out a corresponding movement that follows the setpoint for the yaw behavior of the vehicle 216 to the extent possible.

In this aspect, the target value T3 for influencing the steering wheel actuator 110 and the target value T4 for influencing the wheel steering gear actuator serve to implement the nature of the driver assistance function.

The first controller 220-A determines an influencing of the steering wheel 202 of the vehicle, which is provided by the steering wheel actuator 110.

The second controller 220-B determines an influencing of a behavior of a wheel steering angle for the vehicle, which is provided by the wheel steering gear actuator 112.

The steering wheel actuator 110 and the wheel steering gear actuator 112 are controlled independently of one another with two different controllers in the steering system 230.

For example, the target value T3 for influencing the steering wheel actuator 110 is determined depending on a first controller parameter.

For example, the target value T4 for influencing the wheel steering gear actuator is determined depending on a second controller parameter.

The first controller parameter can specify different dynamics compared to the second controller parameter.

In the example, the first controller parameter is determined depending on a selected driving profile or detected driver profile and a driver assistance function activated in the vehicle for influencing the yaw behavior. The first controller parameter is applicable in the example. The first controller parameter can be applicable for the driver assistance function and the selected driving profile or detected driver profile depending on the desired steering feeling on the steering wheel. The profiles can specify lower dynamic for a profile Comfort and greater dynamics for a profile Sport. The driving profile is also referred to as the driving mode.

For example, both controllers (220-A and 220-B) are PID regulators whose P, I, and/or D portions are parameterized for a given dynamic. Other structures can also be provided for these controllers.

For example, in one application, these controllers are parametrized so that a desired steering wheel behavior is set by the target value T3 for influencing the steering wheel actuator 110 and the vehicle still demonstrates a vehicle behavior that follows the setpoint 216 for this purpose with the target value T4 for influencing the wheel steering gear actuator.

In this example, the trajectory planning and control device 218 and the controllers 220-A, 220-B provide a portion of the function for influencing the vehicle's yaw behavior and steering wheel behavior.

The steering wheel actuator 110 is configured so as to output a control variable 222 for the steering wheel 202. The control variable 222 can serve to provide haptic feedback 224 to the driver 204, e.g., by changing the basic steering feeling, by additive torques, by rotating or also vibrating the steering wheel 202.

For example, the steering wheel 202 is configured so as to output an actual value as a specification V1 for the steering wheel angle set by the driver 204.

The wheel steering gear actuator 112 is configured so as to output a control variable 226 for deflection of at least one steerable wheel.

The control variable 222 changes a state of the steering wheel 202, and the control variable 226 changes the vehicle state 210.

The control variable 222 in the example is a torque for the steering wheel 202. In the example, control variable 226 is a torque for a steerable wheel or for a plurality of steerable wheels of the vehicle.

In the example, the steering system outputs the state of the steering system. This is designated as Z1 in FIG. 2. In the example, the state Z1 comprises the control variable 222, the control variable 226, and the specification V1. The state Z1 can further comprise system states as well as further signals. In the example, it can be provided that the state Z1 is used in order to adjust the controllers 220-A and 220-B.

For example, the nature of the driver assistance function is determined by the control variable 222 and the control variable 226 depending on the state Z1, the input E1, the target value T3 for influencing the steering wheel actuator 110, and the target value T4 for influencing the wheel steering gear actuator.

By way of example, a possible nature is described below and is referred to as the "comfort mode."

In the "comfort mode," the target value T4 is used for influencing the wheel steering gear actuator, and the target value T3 is used for influencing the steering wheel actuator 110.

In the "comfort mode," the driver has no influence on the wheel steering angle on the road within an adjustable independent range of the lane guidance function. In this range, a change of the specification V1, in particular by the driver 204, thus has no influence on the wheel steering angle on the road. In this range, the wheel steering angle on the road is determined exclusively by the lane guidance function via the target value T4 for influencing the wheel steering gear actuator. The setpoint S2 for the wheel steering gear actuator 112 is generally determined depending on the specification V1 and depending on the target value T4 for influencing the wheel steering gear actuator, wherein the target value T4 for influencing the wheel steering gear actuator in the aforementioned range is calculated such that the target V1 is compensated so as to achieve exclusively the behavior of the wheel steering angle of the lane guidance function.

In this mode, if the criteria for operation in this independent range are no longer given, the driver 204 gradually regains control of the wheel steering angle on the road in that the target value T4 for influencing the wheel steering gear actuator and the described compensation of the specification V1 are gradually masked. For example, the target value T4 for influencing the wheel steering gear actuator is guided to constantly 0. That is to say, the range of independence will be exited, because the driver 204 is to have responsibility for the vehicle lateral guidance.

The setpoint S1 is determined generally depending on, among other things, the specification V1 and depending on the target value T3 for influencing the steering wheel actuator 110. Depending on the desired nature, the target value T3 for influencing the steering wheel actuator 110 is calculated. In a particularly advantageous embodiment, the target value T3 for influencing the steering wheel actuator is initially not used or applied by the lane guidance function, e.g., constantly 0 is selected in order to have a smoother steering wheel behavior and thus increase the driving comfort.

In a further nature, it is provided that in this "comfort mode" by means of the target value T3 for influencing the steering wheel actuator 110, a haptic feedback is formed due to the vehicle environment and/or the lane control or other influences arbitrarily and independently of the wheel steering angle control, which is influenced by the target value T4.

A method for operating the vehicle is described below.

Figure 3:
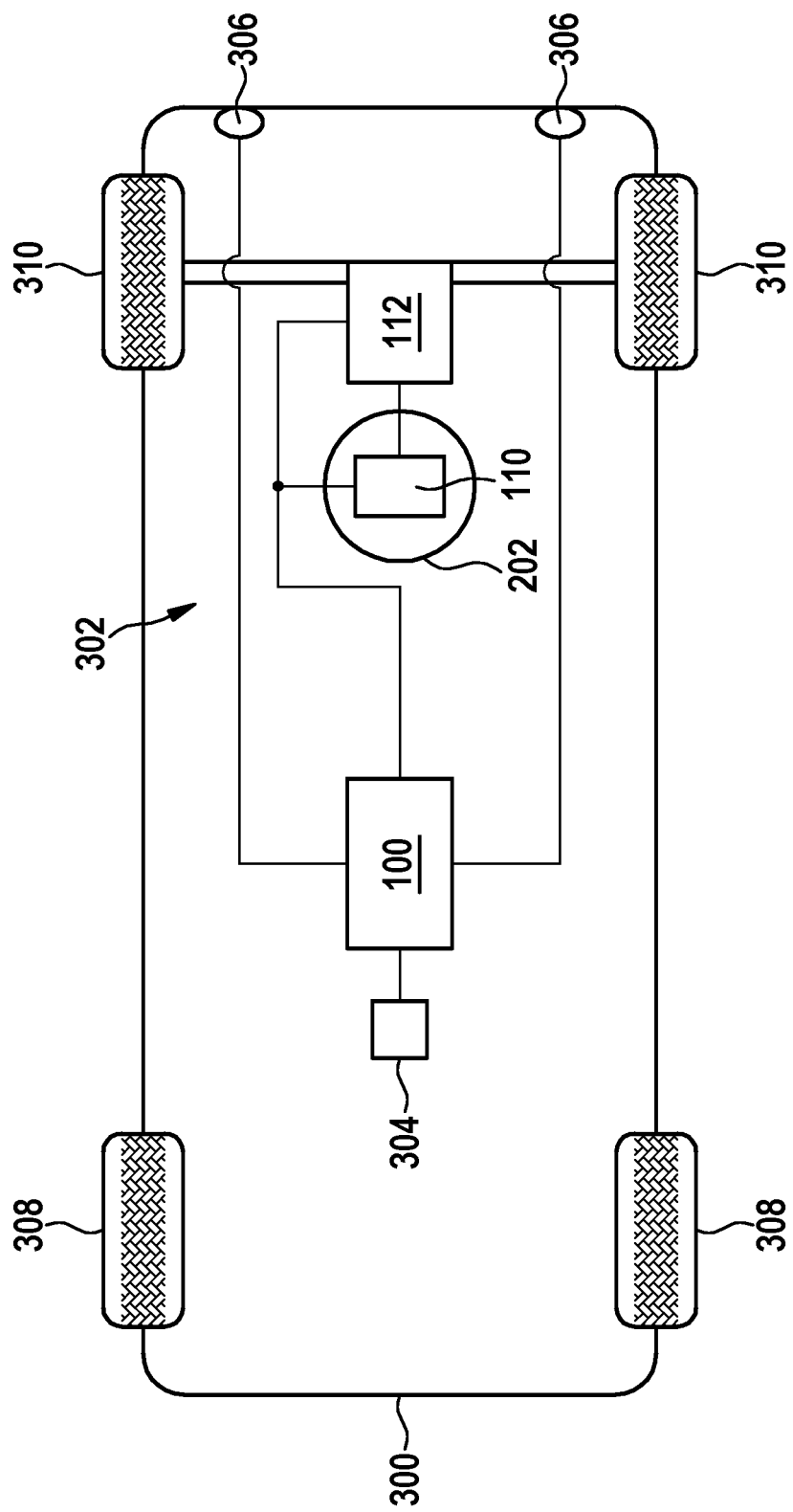
FIG. 3 shows a schematic illustration of a vehicle comprising the apparatus.

FIG. 3 shows a schematic illustration of a vehicle 300 comprising the apparatus 100.

The vehicle 300 comprises a steering system 302. The steering system 302 comprises the steering wheel actuator 110 and the wheel steering gear actuator 112. In the example, the steering wheel actuator 110 and the wheel steering gear actuator 112 are connected to the apparatus 100 via data lines shown as solid lines. The steering system is in particular a steer-by-wire system which comprises two separate interfaces: an interface for influencing the steering wheel actuator 110 and an interface for influencing the wheel steering gear actuator 112.

In the example, the vehicle 300 comprises a yaw rate sensor 304 configured so as to capture the current yaw rate of the vehicle 300. At least one further sensor can also be provided, with which the current yaw rate of the vehicle 300 can be computed from a model.

The vehicle 300 comprises at least one sensor 306 configured so as to capture information about an environment of the vehicle 300. The at least one sensor 306 can comprise the camera, a radar sensor for the radar system, or the LiDAR system. The processing of the sensor data, e.g., from captured images, can be done in the apparatus 100 or in the radar system or LiDAR system, for example.

In the example, these sensors are connected to the apparatus 100 via data lines.

In the example, the vehicle 300 comprises two rear wheels 308 and two front wheels 310. In the example, the rear wheels 308 are not steerable. In the example, the front wheels 310 are steerable by the apparatus 100 via the steering system 302, as described.

In addition to the front wheels 310, or instead of the front wheels 310, the rear wheels 308 can be steerable by the apparatus 100 via the steering system 302.

The data lines can be configured as part of a controller area network (CAN), bus system, or another form of data transmission.

The invention claimed is:

1. A method for influencing a vehicle behavior of a vehicle, comprising:
   determining a setpoint for a steering wheel actuator of a steering system independently of a setpoint for a wheel steering gear actuator;
   actuating the steering wheel actuator based on the determined setpoint for the steering wheel actuator;
   determining the setpoint for the wheel steering gear actuator of the steering system independently of the setpoint for the steering wheel actuator; and
   actuating the wheel steering gear actuator based on the determined setpoint for the wheel steering gear actuator,
   wherein the setpoint for the steering wheel actuator is determined based on a target value for influencing the steering wheel actuator,
   wherein the target value for influencing the steering wheel actuator is determined by a first controller based on a deviation of a current behavior of the vehicle from a setpoint for a behavior of the vehicle,
   wherein the setpoint for the wheel steering gear actuator is determined based on a target value for influencing the wheel steering gear actuator, and
   wherein the target value for influencing the wheel steering gear actuator is determined by a second controller based on the deviation.

2. The method according to claim 1, wherein:
   the target value for influencing the steering wheel actuator is determined based on an applicable first controller parameter,
   the target value for influencing the wheel steering gear actuator is determined based on an applicable second controller parameter, and
   the first controller parameter specifies different dynamics compared to the second controller parameter.

3. The method according to claim 2, wherein the first controller parameter is determined based on a selected driving profile or detected driver profile and a driver assistance function activated in the vehicle for influencing the vehicle behavior.

4. The method according to claim 1, wherein the target value for influencing the wheel steering gear actuator is used exclusively for influencing the vehicle behavior.

5. The method according to claim 1, wherein:
   information about an environment of the vehicle is captured with a camera, a radar system, or a LiDAR system, a set trajectory for the vehicle is determined based on the captured information, and the setpoint for the behavior of the vehicle is determined based on the determined set trajectory.

6. The method according to claim 1, wherein the setpoint for the behavior of the vehicle specifies a desired lateral guidance of the vehicle, which is a set yaw rate, or a set curvature, or a set lateral speed, or a set lateral acceleration.

7. An apparatus for influencing a vehicle behavior of a vehicle, comprising:

an interface for a target value for influencing a steering wheel actuator of a steering system of the vehicle;

an interface for a target value for influencing a wheel steering gear actuator of the steering system of the vehicle;

a first controller; and a second controller, wherein the first controller and the second controller are configured to influence the vehicle behavior of the vehicle by:

determining a setpoint for the steering wheel actuator of the steering system independently of a setpoint for the wheel steering gear actuator, actuating the steering wheel actuator based on the determined setpoint for the steering wheel actuator, determining the setpoint for the wheel steering gear actuator of the steering system independently of the setpoint for the steering wheel actuator, and actuating the wheel steering gear actuator based on the determined setpoint for the wheel steering gear actuator, wherein the setpoint for the steering wheel actuator is determined based on the target value for influencing the steering wheel actuator, wherein the target value for influencing the steering wheel actuator is determined by the first controller based on a deviation of a current behavior of the vehicle from a setpoint for the behavior of the vehicle, wherein the setpoint for the wheel steering gear actuator is determined based on the target value for influencing the wheel steering gear actuator, and wherein the target value for influencing the wheel steering gear actuator is determined by the second controller based on the deviation.

8. A steering system for a vehicle, the steering system comprising:

a steering wheel actuator;

a wheel steering gear actuator;

an apparatus for influencing a vehicle behavior of the vehicle including (i) an interface for a target value for influencing the steering wheel actuator, (ii) an interface for a target value for influencing the wheel steering gear actuator, (iii) a first controller, and (iv) a second controller, wherein the first controller and the second controller are configured to influence the vehicle behavior of the vehicle by:

determining a setpoint for the steering wheel actuator of the steering system independently of a setpoint for the wheel steering gear actuator, actuating the steering wheel actuator based on the determined setpoint for the steering wheel actuator, determining the setpoint for the wheel steering gear actuator of the steering system independently of the setpoint for the steering wheel actuator, and actuating the wheel steering gear actuator based on the determined setpoint for the wheel steering gear actuator, wherein the setpoint for the steering wheel actuator is determined based on the target value for influencing the steering wheel actuator, wherein the target value for influencing the steering wheel actuator is determined by the first controller based on a deviation of a current behavior of the vehicle from a setpoint for the behavior of the vehicle, wherein the setpoint for the wheel steering gear actuator is determined based on the target value for influencing the wheel steering gear actuator, and wherein the target value for influencing the wheel steering gear actuator is determined by the second controller based on the deviation.

9. The method according to claim 1, wherein a computer program comprises computer-readable instructions that, when executed by a computer, cause the method to run on the computer.

* * * * *